United States Patent [19]

Guerra et al.

[11] Patent Number: 5,384,374
[45] Date of Patent: Jan. 24, 1995

[54] CURING FLUOROCARBON ELASTOMERS

[75] Inventors: Miguel A. Guerra, Woodbury; David A. Stivers, St. Paul, both of Minn.

[73] Assignee: Minnesota Mining and Manufacturing Company, St. Paul, Minn.

[21] Appl. No.: 97,955

[22] Filed: Jul. 27, 1993

Related U.S. Application Data

[63] Continuation of Ser. No. 829,010, Jan. 10, 1992, Pat. No. 5,266,650, which is a continuation-in-part of Ser. No. 639,961, Jan. 11, 1991, abandoned.

[51] Int. Cl.⁶ .................. C08F 14/22; C08F 214/22; C08K 5/02
[52] U.S. Cl. .................. 525/326.4; 524/462; 525/326.2; 525/326.3; 526/247; 526/254; 526/255
[58] Field of Search .......... 524/462; 525/326.2, 525/326.3, 326.4; 526/247, 255, 256

[56] References Cited

U.S. PATENT DOCUMENTS

| | | | |
|---|---|---|---|
| T107,801 | 5/1987 | Nersasion | 525/326.3 |
| 2,968,649 | 1/1961 | Pailthorp et al. | 260/80.5 |
| 3,051,677 | 8/1962 | Rexford | 260/29.6 |
| 3,125,599 | 5/1964 | Warnell | 260/535 |
| 3,159,609 | 12/1964 | Harris et al. | 260/87.5 |
| 3,250,807 | 5/1966 | Fritz et al. | 260/535 |
| 3,318,854 | 5/1967 | Honn et al. | 260/87.7 |
| 3,392,097 | 7/1968 | Gozzo et al. | 204/159.22 |
| 3,442,942 | 5/1969 | Sianesi et al. | 260/544 |
| 3,467,635 | 9/1969 | Brasen et al. | 260/80.76 |
| 3,505,411 | 4/1970 | Rice | 260/615 |
| 3,546,186 | 12/1970 | Gladding et al. | 526/247 |
| 3,632,788 | 1/1972 | Stivers et al. | 260/30.8 R |
| 3,699,145 | 10/1972 | Sianesi et al. | 260/463 |
| 3,715,378 | 2/1973 | Sianesi et al. | 260/463 |
| 3,752,787 | 8/1973 | de Brunner | 260/41 B |
| 3,810,874 | 5/1974 | Mitsch et al. | 260/75 H |
| 3,810,875 | 5/1974 | Rice et al. | 260/899 |
| 3,849,504 | 11/1974 | Mitsch | 260/615 BF |
| 3,876,654 | 4/1975 | Pattison | 260/30.4 R |
| 4,035,565 | 7/1977 | Apotheker et al. | 526/247 |
| 4,094,911 | 6/1978 | Mitsch et al. | 260/615 A |
| 4,214,060 | 7/1980 | Apotheker et al. | 525/387 |
| 4,233,421 | 11/1980 | Worm | 525/343 |
| 4,259,463 | 3/1981 | Moggi et al. | 525/331 |
| 4,263,414 | 4/1981 | West | 525/102 |
| 4,278,776 | 7/1981 | Mauro et al. | 525/178 |
| 4,287,320 | 9/1981 | Kolb | 526/247 |
| 4,358,559 | 11/1982 | Holcomb et al. | 524/380 |
| 4,446,270 | 5/1984 | Guenthner et al. | 524/436 |
| 4,450,263 | 5/1984 | West | 526/249 |
| 4,564,662 | 1/1986 | Albin | 525/326.2 |
| 4,810,760 | 3/1989 | Strepparola et al. | 525/326.3 |
| 4,882,390 | 11/1989 | Grootaert et al. | 525/326.3 |
| 4,894,418 | 1/1990 | Strepparola et al. | 525/326.2 |
| 4,894,484 | 1/1990 | Lagow et al. | 568/615 |
| 5,026,786 | 6/1991 | Marchionni et al. | 525/326.4 |

FOREIGN PATENT DOCUMENTS

| | | |
|---|---|---|
| 581641 | 12/1988 | Australia . |
| 222201 | 5/1987 | European Pat. Off. . |
| 310966 | 4/1989 | European Pat. Off. . |
| 0035289 | 3/1977 | Japan ............ 526/247 |
| 0109811 | 7/1982 | Japan ............ 526/247 |
| 0217749 | 12/1984 | Japan ............ 525/326.3 |
| WO90/06296 | 6/1990 | WIPO . |

OTHER PUBLICATIONS

Brullo, R. A., "Fluoroelastomer Rubber for Automotive Applicatin," Automotive Elastomer & Design, Ju. 1985.

Caporiccio, G., "Perfluoropolyether Fluids for Vacuum Technologies, Inc. Eng. Chem. Prod. Res. Dev." 1982, pp. 515–519.

"Fluoroelastomers Seal Up Automotive Future," Materials Engineering, Oct. 1988.

Patent Abstracts of Japan, vol. 9, No. 88 (C-276)(1811) 17 Apr. 1985 and JP,A,59 217 749 (Asahi Kasei Kogyo KK) 7 Dec. 1984. (English-language translation of Japanese patent application enclosed).

West, A. C. and Holcomb, A. G., "Fluorinated Elastomers," Kirk–Othmer, Encyclopedia of Chemical Technology, vol. 8, pp. 500–515 (3rd et, John Wiley & Sons, 1979).

U.S. Defensive Publication T107,801 (Nersian), May 5, 1987.

Primary Examiner—Peter Szekely
Attorney, Agent, or Firm—Gary L. Griswold; Walter N. Kirn; Robert H. Brink

[57] ABSTRACT

Fluorocarbon elastomer gum is compounded with fluorinated ether compositions, the resulting compounded gum is shaped and heated to form a cured shaped article such as automotive fuel line hose or O-ring.

16 Claims, No Drawings

CURING FLUOROCARBON ELASTOMERS

This is a continuation of application Ser. No. 07/829,010 filed Jan. 10, 1992, now U.S. Pat. No. 5,266,650 which is a continuation in part of copending U.S. application Ser. No. 07/639,961 filed Jan. 11, 1991, abandoned.

This invention relates to fluorocarbon elastomers and their curing. In another aspect it relates to fluorinated ether compositions used in curing fluorocarbon elastomers. In another aspect it relates to fluorocarbon gum composition containing fluorinated ether compositions. In a further aspect it relates to a cured, shaped article of fluorocarbon elastomer, such as automotive fuel line hose and O-ring seals.

Fluorocarbon elastomers are synthetic elastomeric polymers with a high fluorine content—see, for example, West, A. C. and Holcomb, A. G., "Fluorinated Elastomers, Kirk-Othmer, *Encyclopedia of Chemical Technology*, Vol. 8, pp. 500–15 (#3rd ed., John Wiley & Sons, 1979). Fluorocarbon elastomers, particularly the copolymers of vinylidene fluoride with other ethylenically Unsaturated halogenated monomers, such as $C_3F_6$ (hexafluoropropene) have become the polymers of choice for high temperature applications, such as seals, gaskets, and linings, especially when shaped articles thereof are subject to exposure to aggressive or harsh environments, such as solvents, lubricants, and oxidizing or reducing conditions.

A major drawback to many applications of shaped articles made of such fluorocarbon elastomers has been their inability to satisfactorily function at low temperatures. At temperatures only slightly below 0° C., the articles become stiff and fail to perform satisfactorily. Many fluoroelastomers also exhibit a tendency to become "scorchy" i.e., they cure prematurely or too rapidly when compounded. Fluoroelastomers may also adhere to dies upon curing making removal of the shaped fluoroelastomer article difficult.

Such fluorocarbon elastomers in general can be compounded and cured to have high tensile strength, good tear resistance, and low compression set. Such compounded polymers are typically fabricated into automotive engine oil seals, fuel system components, such as fuel line hoses and O-ring seals, and drive train seals. Smaller, hotter-running automotive engines, modern fuel blends, and aggressive oil additives and other chemical substances used in operating the engines have made fluorocarbon elastomers the polymers of choice for a host of elastomeric engine components where reliable sealing is required and of environmental concern—see Brullo, R. A., "Fluoroelastomer Rubber for Automotive Applications", Automotive Elastomer & Design, June 1985, and "Fluoroelastomers Seal Up Automotive Future," Materials Engineering, October, 1988.

Most commercially available fluorocarbon elastomers, such as the illustrative polymers described above are sold, for example, under the trademarks "AFLAS", "FLUOREL" and "VITON". Some of these are crosslinked with aromatic polyhydroxy compounds, such as bisphenols, which are compounded with the elastomer gum along with a curing accelerator, such as a quaternary phosphonium salt, and acid acceptors, such as magnesium oxide and calcium hydroxide—see, for example, U.S. Pat. No. 4,287,320 (Kolb). Others are bromine-containing, peroxide-curable fluorocarbon elastomers—see U.S. Pat. Nos. 4,035,565 (Apotheker et al.) and U.S. Pat. No. 4,450,263 (West).

Several general types of fluorinated ethers have been described in the literature. One type is characterized by one of several homopolymeric segments or blocks of repeating units of the formula $—CF(CF_3)CF_2—O—$ and made from hexafluoropropylene epoxide, see e.g., U.S. Pat. No. 3,250,807 (Fritz et al.). Another type is that characterized by blocks of repeating units of the formula $—CF_2CF_2—O—$ and made from tetrafluoroethylene epoxide, see for example, U.S. Pat. No. 3,125,599 (Warnell). Others, made by reacting oxygen with tetrafluoroethylene or hexafluoropropylene, are characterized by a backbone made of repeating $—CF_2O—$ units, see e.g., U.S. Pat. No. 3,392,097 (Carraro et al.), or $—CF(CF_3)CF_2O—$ units, see e.g., U.S. Pat. No. 3,442,942 (Sianesi et al.), or, in addition to either of these units, units of the formula $—CF(CF_3)O—$, see e.g., U.S. Pat. No. 3,699,145 (Sianesi et al.), or a backbone consisting of randomly distributed $—CF_2O—$ and $CF_2CF_2O—$ units, see e.g. U.S. Pat. No. 3,715,378 (Sianesi et al.), or a backbone made up of $—CF(CF_3)CF_2O—$ and $—CF_2CF_2O—$ units and, optionally, $—CF_2O—$ and $—CF(CF_3)O—$ units. Another type of fluorinated ether is that characterized by backbone units of the formula $—(CF_2)_aO(CF_2)_b—$ made by photopolymerization, see e.g., U.S. Pat. No. 3,504,411 (Rice) and U.S. Pat. No. 3,849,594 (Mitsch et al.).

U.S. Pat. Nos. 3,810,874 (Mitsch et al.) and U.S. Pat. No. 4,094,911 (Mitsch et al.) disclose poly(perfluoroalkylene oxides) terminated with polymerizable functional groups which can be polymerized to prepare certain polymers, e.g. polyurethanes, having low glass transition temperatures and low-temperature flexibility. U.S. Pat. No. 3,810,875 (Rice et al.) discloses use of poly(perfluoroakylene oxide) peroxides with ethyenically unsaturated monomers in making block copolymers having good low-temperature flexibility. Fluorinated ethers with nonfunctional terminal moieties are sold under the trademarks "KRYTOX" and "FOMBLIN" for use as vacuum pump fluids, see e.g., G. Caporiccio et al., *Ind. Eng. Chem. Prod. Res. Dev.* 1982, 21, 515–19.

U.S. Pat. No. 4,810,760 (Strepparola et. al.) discloses compositions of fluoroelastomers crosslinked with dihydroxypolyfluoroethers. The dihydroxypolyfluoroethers of Strepparola contain either branched moieties, or are random copolymers containing $—CF_2O—$ repeating units, or contain partially fluorinated repeat units. When used to crosslink fluorocarbon elastomers, the fluorinated ethers of Strepparola are said to give materials with improved heat stability and greater resistance to compression set. U.S. Pat. No. 4,894,418 (Strepparola et al.) discloses compositions of fluoroelastomers comprising, as a processing coadjuvant, a mono- or dihydroxypolyfluoroether. These mono- or dihydroxypolyfluoroethers have similar structures to those disclosed in U.S. Pat. No. 4,810,760 (Strepparola et al.). The addition of these mono- or dihydroxypolyfluoroethers to conventional vulcanizable fluoroelastomer compositions is said to improve the processability of the resulting mixture and the low temperature brittle point of the cured mixture.

U.S. Pat. No. 3,632,788 (Stivers et al.) discloses fluoro-olefinic elastomeric formulations with improved low temperature flexibility and softness. The improved properties are imparted by the incorporation of one or more low melting low molecular weight, polar, fluoroaliphatic compounds.

U.S. Pat. No. 5,026,786 (Marchionni et al.) discloses a process for the manufacture of certain perfluoropolyethers. These perfluoropolyethers comprise randomly distributed perfluoroxyalkylene units. These perfluoropolyethers are said to improve the extrudability of elastomer compositions and to decrease the adhesion of vulcanized articles to molds.

U.S. Pat. No. 4,278,776 (Mauro et al.) discloses vulcanizable mixes based on fluoroelastomer and which comprise, as a processing aid, at least one fluorinated polyamide. Certain perfluoropolyethers are said to improve the low temperature properties of the vulcanisates.

European Pat. Pub. No. 222,201 (Tommasi et al.) discloses vulcanizable rubber blends comprising certain perfluoropolyethers. These perfluoropolyethers have brominated or fluorinated end groups. These blends are said to have improved processability.

European Pat. Pub. No. 310,966 (Arcella et al.) discloses rubber blends comprising certain perfluoropolyethers. These perfluoropolyethers comprise perfluoroalkyl end groups. These rubber blends are said to have improved mold-release properties.

Briefly, in one aspect, this invention provides a fluorocarbon elastomer composition comprising (1) fluorocarbon elastomer gum, such as a copolymer of vinylidene fluoride and hexafluoropropene, and, (2) a fluorinated ether composition comprising a functional fluoroaliphatic mono- or polyether, e.g.

HOCH$_2$—CF$_2$OCF$_2$CF$_2$OCF$_2$—CH$_2$OH,
HOCH$_2$—CF$_2$O(CF$_2$CF$_2$OCF$_2$CF$_2$OCF$_2$)$_n$CF$_2$—CH$_2$OH,
H$_2$NCH$_2$—CF$_2$O(CF$_2$CF$_2$O)$_n$CF$_2$—CH$_2$NH$_2$,
HOCH$_2$—CF$_2$CF$_2$OCF$_2$CF$_2$—CH$_2$OH,
CF$_3$—O(CF$_2$CF$_2$O)$_n$—CF$_2$—CH$_2$OCH$_2$CH=CH$_2$, and
CF$_3$—O(CF$_2$CF$_2$O)$_n$—CF$_2$—CH$_2$OH.

The functional fluoroaliphatic mono- or polyether comprises a perfluoroether structure which consists or consists essentially of two or more perfluoroalkylene moieties, e.g. —CF$_2$— and —CF$_2$CF$_2$—, bonded together by ether oxygen atoms in a linear (or non-branched), regular (or non-random), divalent, and acyclic perfluoroether structure, e.g. a perfluoroalkyleneoxyalkylene. Each end of the perfluoroether structure is bonded to a terminal group, at least one of such terminal groups having a functional moiety reactive with said fluorocarbon elastomer gum. Examples of terminal groups include —CH$_2$OH, —CH$_2$NH$_2$, and —C(O)NHCH$_2$CH=CH$_2$. Said fluorinated ether composition acts as a low-temperature flexibilizer and imparts improved low-temperature flexibility to the cured fluorocarbon elastomer composition.

In another aspect, said fluorinated ether composition imparts improved mold-release properties to the cured fluorocarbon elastomer composition.

In a further aspect, said fluorocarbon elastomer composition can be compounded to be resistant to scorch during curing.

A first class of fluorinated ether compositions is that where there is an average number of said reactive terminal groups per fluorinated ether molecule of greater than 1.0 and less than or equal to 2.0. A second class of fluorinated ether compositions is that where there is an average number of said reactive terminal groups per fluorinated ether molecule of less than or equal to 1.0.

The above fluorocarbon elastomer gum and fluorinated ether composition can be compounded or mixed in one or several steps, and then the mixture can be processed and shaped, for example, by extrusion (for example, in the form of a hose or hose lining) or molding (for example, in the form of an O-ring seal). The shaped article can then be heated to cure the gum composition and form a cured elastomer article. When the fluorinated ether composition used in a reactive mixture with the fluorocarbon elastomer gum is of said second class, the resulting composition is further compounded with a crosslinking agent, for example, 2,2-bis-(4-hydroxyphenyl) hexafluoropropane, to obtain a curable composition.

The cured fluorocarbon elastomer mixture, containing either class of fluorinated ether composition, has excellent low-temperature flexibility while retaining the desired physical properties, for example tensile strength and elongation, of conventionally compounded and cured fluorocarbon elastomer compositions. Particularly useful articles that can be fabricated from the fluorocarbon elastomer compositions of this invention are fluorocarbon elastomer automotive components, such as those described in the two above cited journal articles of Brullo, e.g., fuel line hoses.

Said first class of fluorinated ether composition useful in this invention comprises functional fluorinated ethers which can be represented by the Formula

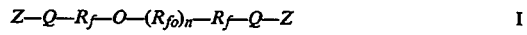

$$Z-Q-R_f-O-(R_{fo})_n-R_f-Q-Z \qquad \text{I}$$

In formula I, —R$_f$—O—(R$_{fo}$)$_n$—R$_f$— represents one type of said perfluoroether structure and Z—Q— represents the terminal groups, where Q is a divalent linking group and Z is a moiety reactive with said fluorocarbon elastomer. The average number of Z groups per fluorinated ether molecule of this class is greater than 1.0 and less than or equal to 2.0. Said Z group is selected from the group of members consisting of hydroxyl, primary amino, and allyl (—CH$_2$—CH=CH$_2$). The divalent linking group Q is preferably selected from the group consisting of —CO—, —O—, —SO$_2$—, —C$_y$H$_{2y}$— where y is 1 to 20, —C$_6$H$_4$—, —C$_6$H$_3$Cl—, —OC$_2$H$_4$—, —CONR— or —SO$_2$NR— where R is lower alkyl of 1 to 3 carbon atoms, or combinations of said groups such as —CH$_2$CO—. However, when Q is said —CO—, —O—, —CONR—, —SO$_2$NR—, or —SO$_2$—, then Z is allyl. R$_f$ is a non-branched, perfluoroalkylene group of 1 to 20 carbon atoms. R$_{fo}$ is a perfluoroalkyleneoxy group selected from the group consisting of —(CF$_2$)$_2$—O—, —(CF$_2$)$_3$—O—, —(CF$_2$)$_4$—O—, —CF$_2$—CF$_2$—O—CF$_2$—O—, —CF$_2$—CF$_2$—O—CF$_2$—CF$_2$—O—CF$_2$—O—. The subscript n is a number from 0 to 30. When n is greater than 1.0, (R$_{fo}$)$_n$ is a homopolymer.

Said second class of fluorinated ether composition useful in this invention comprises functional fluorinated ethers which can be represented by the Formula

$$Z-Q-R_f-O-(R_{fo})_n-R_f \qquad \text{II}$$

In formula II, —R$_f$—O—(R$_{fo}$)$_n$— represents one type of said perfluoroether structure, Z, R$_f$, R$_{fo}$, n, and Q are as described above for formula I. The average number of Z groups per fluorinated ether molecule of this class is less than or equal to 1.0. R$_f$ is a nonbranched, monovalent, fluoroaliphatic group containing from 1 to 10 carbon atoms.

The fluorocarbon elastomer compositions of the present invention may be further compounded, and cured according to standard methods. In order to form cured articles, the compositions of the present invention comprising the fluorochemical ether compositions of the second class, represented by Formula II, will need to be further compounded with a crosslinking agent, either the fluorinated ether composition, represented by Formula I, of this invention or with a conventional cure system, such as a polyhydroxy, or a peroxide cure system.

The most common crosslinking agent for fluorocarbon elastomer gum is a polyhydroxy compound. The polyhydroxy compound used in its free or non-salt form and as the anionic part of the salt component of the crosslinking agent can be any of those polyhydroxy compounds known in the art to function as a crosslinking agent or co-curative for fluoroelastomers, such as those polyhydroxy compounds disclosed in U.S. Pat. Nos. 4,259,463 (Moggi et al.), U.S. Pat. No. 3,876,654 (Pattison), U.S. Pat. No. 4,233,421 (Worm), and U.S. Defensive Publication T107,801 (Nersasian). For example, representative aromatic polyhydroxy compounds include any one of the following: di-, tri-, and tetrahydroxybenzenes, naphthalenes, and anthracenes, and bisphenols of the Formula

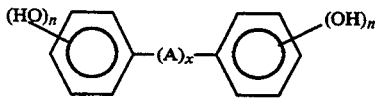

III wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol Formula III that the —OH groups can be attached in any position (other than number one) in either ring. Blends of two or more such compounds can also be used. One of the most useful aromatic polyphenols is the bisphenol compound known as Bisphenol AF, which is 2,2-bis(4-hydroxyphenyl)hexafluoropropane. The compounds 4,4'-dihydroxydiphenyl sulfone (Bisphenol S) and 2,2-bis(4-hydroxyphenyl)propane (Bisphenol A) are also considered useful in this invention. Another useful aromatic polyhydroxy compound is hydroquinone. Others are dihydroxybenzenes such as catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Representative aliphatic polyhydroxy compounds which can also be used as the polyhydroxy compound in this invention include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

The organo-onium compound which can be incorporated into or compounded with the fluoroelastomer gum as a co-curing agent or vulcanization accelerator include those known and described in the art—see, for example, the description of such organo-onium compounds in U.S. Pat. No. 4,882,390 (Grootaert et al.) The organo-onium compounds which can be used include quaternary organo-onium compounds, such as ammonium, arsonium, phosphonium, stibonium, amino-phosphonium, phosphorane (e.g., triarylphosphorane), and iminium compounds, and sulfonium compounds. Mixtures of organo-onium compounds are also useful in this invention. The ammonium, phosphonium, arsonium, and stibonium salts or compounds preferably have the general formula:

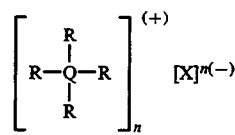

VII where Q is nitrogen, phosphorous, arsenic or antimony; X is an organic or inorganic anion (e.g., halide, sulfate, acetate, phosphate, phosphonate, hydroxide, alkoxide, phenoxide, or bisphenoxide); n is equal to the valence of the anion X; and each R is independently an alkyl, aryl, alkenyl, or combinations thereof. Each R can be substituted with chlorine, fluorine, bromine, cyano, —OR' or —COOR' where R' is a $C_1$ to $C_{20}$ alkyl, aryl, aralkyl, or alkenyl. Any pair of the R groups can be connected with each other and with the Q atom to form a heterocyclic ring. A preferred organo-onium compound where the aromatic polyhydroxy compound used is Bisphenol AF, is where in formula VII the Q is phosphorous, X is a chloride anion, n is 1, and three of the R groups are phenyl moieties and the remaining R group is a benzyl moiety. A preferred class of formula VII is where at least one of the R groups is alkyl or alkenyl. In another class of quaternary organo-onium compounds which can be used in this invention, the nitrogen, phosphorus, arsenic or antimony atom may be a heteroatom in a cyclic structure, e.g., 8-benzyl-1,8-diaza-bicyclo[5,4,0]-7-undecenium chloride. Another class which can be used is amino-phosphonium compounds, some of which are described, for example, in U.S. Pat. No. 4,259,463 (Moggi et al.). Another useful class is phosphorane compounds disclosed, for example, in U.S. Pat. Nos. 3,752,787 (de Brunner) and U.S. Pat. No. 4,882,390 (Grootaert et al.). Another class of quaternary organo-onium compounds useful in this invention are iminium compounds, where are also described in said U.S. Pat. No. 4,882,390.

The compounded gum formulation of this invention can also include processing agents, such as those conventionally used to aid in the molding or extrusion of the formulation e.g. carnauba wax or dichlorodiphenyl sulfone, including those of the formula $R_fSO_2NHR''$, where $R_f$ is a fluoroaliphatic radical such as a perfluoroalkyl, e.g., $C_nF_{2n+1}$ where n is 4 to 20, or perfluorocycloalkyl, e.g., $C_nF_{2n-1}$ where n is 5 to 20. Another type of processing aid which can be used in this invention is diorgano sulfur oxides, such as those described in U.S. Pat. No. 4,287,320 (Kolb).

Fillers can be mixed with the fluoroelastomer gum to improve molding characteristics and other properties. When a filler is employed, it can be added to the vulcanization recipe in amounts of up to about 100 parts per hundred parts by weight of gum, preferably between about 15 to 50 parts per hundred parts by weight of the gum. Examples of fillers which may be used are reinforcing thermal grade carbon blacks or non-black pigments of relatively low reinforcement characteristics such as clays and barytes.

Fluorocarbon elastomers which can be used in this invention include those described, for example, in the aforementioned prior art, e.g., U.S. Pat. Nos. 3,159,609 (Harris et al.), U.S. Pat. No. 3,467,635 (Brasen et al.), U.S. Pat. No. 4,214,060 (Apotheker), U.S. Pat. No. 4,233,421 (Worm), and U.S. Pat. No. 4,263,414 (West). Some of these are commercially available, sold under trademarks such as "Fluorel" and "Viton", and are copolymers whose interpolymerized units are generally derived from vinylidene fluoride and one or more other co-monomers. Other useful fluorocarbon elastomers include copolymers of tetrafluoroethylene and propylene, such as those commercially available as AFLAS TM elastomers. Among the fluoroelastomer polymers which may be compounded in accordance with this invention are the elastomeric copolymers whose interpolymerized units are derived from two or more of the following fluoromonomers: vinylidene fluoride, hexafluoropropene, chlorotrifluoroethylene, 2-chloropentafluoropropene, fluorinated methyl vinyl ether, tetrafluoroethylene, 1-hydropentafluoropropene, dichlorodifluoroethylene, trifluoroethylene, 1,1-chlorofluoroethylene, and mixtures thereof. Said fluoromonomers may also be copolymerized with other compounds such as non-fluorinated alpha-olefin co-monomers, e.g., ethylene or propylene. The preferred elastomers are copolymers of vinylidene fluoride with at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, lower fluoroalkyl radical, or lower fluoroalkoxy radical; particularly preferred are hexafluoropropene, tetrafluoroethylene, chlorotrifluroethylene, and 1-hydropentafluoropropene. Particularly preferred are the fluorinated elastomers produced by copolymerizing vinylidene fluoride with hexafluoropropene as described in U.S. Pat. Nos. 3,051,677 (Rexford) and U.S. Pat. No. 3,318,854 (Pailthorp et al.), and those copolymers produced by copolymerizing vinylidene fluoride, hexafluoropropene, and tetrafluoroethylene as described in U.S. Pat. No. 2,968,649 (Honn et al.). The elastomeric copolymers of hexafluoropropene and vinylidene fluoride preferably will have between about 15 and about 50 mole percent hexafluoropropene, optionally with the addition of up to 30 mole percent tetrafluoroethylene. Mixtures or blends of elastomers, e.g., of different viscosities, are also suitable.

The relative amounts of the various ingredients in preferred fluorocarbon elastomer compositions of this invention, chosen to provide the desired cure rate and degree of cure, are illustrated for onium curable elastomer compositions and for peroxide curable elastomer systems in the table below. The amount of fluorinated ether composition will vary, but generally will be present in an amount sufficient to impart improved low-temperature properties to the cured composition. Where the fluorinated ether composition is used as a crosslinker, it will generally be present in an amount sufficient to crosslink the gum. The amounts given are in terms of parts per 100 parts by weight of the gum, "phr".

| INGREDIENT | ELASTOMER SYSTEM | |
|---|---|---|
| | ONIUM CURABLE | PEROXIDE CURABLE |
| Fluorinated ether composition of this invention | 2–50 phr | 2–50 phr |
| Polyhydroxy compound (crosslinking agent) | 0*–5 phr | 0 |
| Organo-onium compound (co-curing agent) | 0–2 phr | 0 |
| Bivalent metal oxide and/or hydroxide (acid acceptor) | 2–30 phr | 0 |
| Peroxide | 0 | 1–6 phr |
| Triallylisolyenurate (TAIC) (crosslinking agent) | 0 | 0*–10 phr |
| Fillers | 0–100 phr | 0–100 phr |

*Note that when the fluorinated ether compositions of the first class (Formula I) are used, it is not required to include crosslinking agents to affect cure.

The aforementioned amounts of the fluorinated ether composition of this invention, which impart improved low-temperature properties to the cured composition, also impart improved mold-release properties to the cured composition. If desired, the amount of the fluorinated ether may be only an amount sufficient to impart improved mold-release properties to the cured composition. Generally, as little as 0.5 phr of the fluorinated ether composition will be sufficient to impart improved mold-release properties.

In accordance with this invention, the desired amounts of compounding ingredients and other conventional adjuvants or ingredients are added to the unvulcanized fluorocarbon gum stock and intimately admixed or compounded therewith by employing any of the usual rubber mixing devices such as Banbury mixers, roll mills, or any other convenient mixing device. The temperature of the mixture on the mill typically will not rise above about 120° C. During milling the components and adjuvants are distributed uniformly throughout the gum. The curing process typically comprises extrusion of the compounded mixture or pressing the compounded mixture in a mold, e.g., a cavity or a transfer mold, and subsequent oven-curing. Pressing of the compounded mixture (press cure) is usually conducted at a temperature between about 95° C. and about 230° C., preferably between about 150C and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent, such as a silicone oil, and prebaked. The molded vulcanizate is then usually post-cured (oven-cured) at a temperature usually between about 150C and about 315° C., typically at about 232° C., for a period of from about 2 hours to 50 hours or more depending on the cross-sectional thickness of the article. The compositions of this invention can be used to form seals, O-rings, gaskets, etc.

Objects and advantages of this invention are illustrated in the following nonlimiting examples.

TEST METHODS

In the following examples, indicated results were obtained using the following test methods:

Hardness ASTM D 2240-85 Method A. A Type A-2 Shore Durometer was used. Units reported in parts.

Tensile Strength at Break, Elongation at Break, and Modulus at 100% Elongation. ASTM D 412-75 on sample cut from 1.8 mm sheet with ASTM Die D. Units reported in psi.

10% Retraction (TR-10) ASTM D1329. Unit reported in ° C. Molecular Weight and Functionality Determined by 19F NMR end group analysis.

Mooney Viscosity ASTM 1646-87

In the examples, the preparation of various fluorinated ether compositions and their use as low temperature flexibilizers (and, in some cases, crosslinking agents) for fluorocarbon elastomer gums are described. In preparing the fluorinated ether compositions, commercially available aliphatic ethers such as those represented by the formula $HO-(CH_2CH_2O)_n-H$ were converted to the corresponding mono- or di- acetates such as $CH_3(CO)O-(CH_2CH_2O)_n-(CO)CH_3$. These acetates were then fluorinated by the direct fluorination technique as taught in WO 90/05413 (Costello et al.), or by the fluorination technique taught in U.S. Pat. No. 4,894,484 (Lagow et al.). The resulting fluorinated acetates such as $CF_3(CO)O-(CF_2CF_2O)_n-(CO)CF_3$ were hydrolyzed by treatment with methanol to give methyl esters such as $CH_3O(CO)CF_2O-(CF_2CF_2)_{n-2}-CF_2(CO)-OCH_3$. These methyl esters were then reduced to the corresponding dihydroalcohols such as $HOCH_2-CF_2O-(CF_2CF_2)_{n-2}-CF_2CH_2OH$, as described in U.S. Pat. No. 4,094,911 (Mitsch et al.).

Commercially available fluoroelastomer gums were compounded with various ingredients and cured. The physical properties of the cured composition were then tested. The gums used were copolymers which, except as otherwise indicated, have the weight percents of interpolymerized units derived from the monomers shown below. Gum D also contains a minor amount of a bromine-containing cure-site monomer.

| GUM | $CF_2=CH_2$ | $CF_2=CFCF_3$ | $CF_2=CF_2$ | $CH_2=CHCH_3$ | $CF_2=CFOCF_3$ |
|---|---|---|---|---|---|
| A | 62 | 38 | — | — | — |
| B | 42 | 34 | 24 | — | — |
| C | 32 | — | 40 | 28 | — |
| D | 62 | 38 | — | — | — |
| E | 59 | — | 6 | — | 35 |
| F | 32 | — | 40 | 28 | — |
| G | 41 | — | 20 | — | 39 |
| H | — | — | 73 | 27 | — |

EXAMPLE 1

A fluorinated ether composition comprising the structure $HO-CH_2-CF_2-O-(CF_2CF_2)_nCF_2-CH_2-OH$, having an average molecular weight of 1500, and an average hydroxyl functionality of 1.8, was prepared by direct fluorination of polyethylene glycol diacetate (Aldrich Chemical, Milwaukee, Wis.).

To 100 parts of fluoroelastomer gum A, was added 0.5 phr of triphenylbenzyl phosphonium chloride, followed by 30 phr of carbon black, 3 phr of MgO, and 6 phr of Ca(OH)$_2$ using a two-roll mill. To this compounded mixture was added 20 phr of the fluorinated ether composition described above. Milling continued until a homogeneous blend formed. The gum was press-cured for 15 minutes at 177° C. and then post-cured for 24 hours at 204° C. The results of the tests are shown in Table 1.

EXAMPLE 2

A fluorinated ether composition comprising the same structure as in Example 1, having an average molecular weight of 624, and an average hydroxyl functionality of 1.6, was prepared as in example 1.

100 parts of fluoroelastomer gum A was compounded, milled, press-cured, and post-cured as in Example 1 using 20 phr of the above fluorinated ether composition. The results of the tests are reported in Table 1.

EXAMPLE 3

A fluorinated ether compositions comprising the same structure as in Example 1, having an average molecular weight of 727, and an average hydroxyl functionality of 1.5, was prepared as in Example 1.

100 parts of fluoroelastomer gum A was compounded, milled, press-cured and post-cured as in Example 1 using 20 phr of the above fluorinated ether composition. The results of the tests are reported in Table 1.

EXAMPLE 4

A fluorinated ether composition comprising the same structure as in Example 1, having an average molecular weight of 555, and an average hydroxyl functionality of 1.8, was prepared as in Example 1.

100 parts of fluoroelastomer gum B was compounded, milled, press-cured, and post-cured as in Example 1, using 6.2 phr of the above fluorinated ether composition. The results of the tests are reported in Table 1.

EXAMPLE 5

A fluorinated ether composition comprising the same structure as in Example 1, having an average molecular weight of 1728, and an average hydroxyl functionality of 1.6, was prepared as in Example 1.

100 parts of fluoroelastomer gum B was compounded, milled, press-cured, and post-cured as in Example 1 using 24.5 phr of the above fluorinated ether composition. The results of the tests are reported in Table 1.

EXAMPLE 6

A fluorinated ether composition comprising the same structure as in Example 1, having an average molecular weight of 956, and an average hydroxyl functionality of 1.5, was prepared as in Example 1.

100 parts of fluoroelastomer gum B was compounded, milled, press-cured, and post-cured as in Example 1 using 20 phr of the above fluorinated ether composition. The results of the tests are reported in Table 1.

EXAMPLE 7

A fluorinated ether composition comprising the same structure as in Example 1, having an average molecular weight of 956, and an average hydroxyl functionality of 1.5, was prepared as in Example 1 except that 0.8 parts of tributyl allyl phosphonium chloride was substituted for the 0.5 parts of triphenylbenzyl phosphonium chloride.

100 parts of fluoroelastomer gum C was compounded, milled, press-cured, and post-cured as in Example 1 using 15 phr of the above fluorinated ether composition. The results of the tests are reported in Table 1.

COMPARATIVE EXAMPLES 1-C, 2-C AND 3-C

For comparative purposes, the fluoroelastomer gums A, B, and C were compounded, milled, press-cured, and post-cured as in Example 1, substituting 2 phr of Bisphenol AF for the fluorinated ether compositions of the previous Examples.

EXAMPLE 8

A fluorinated ether composition comprising structure $HO-CH_2-(CF_2)_3-O-(CF_2CF_2CF_2CF_2O)_n-(CF_2)_3-CH_2-OH$, having an average molecular weight of 850, and an average hydroxyl functionality of 1.64, was prepared from poly(tetramethyleneoxide) diol (commercially available from BASF) by direct fluorination as in Example 1.

100 parts of fluoroelastomer gum A was milled, press-cured, and post-cured as in Example 1, using 20 phr of the above fluorinated ether composition. The results of the tests are shown in Table 1.

EXAMPLE 9

A fluorinated ether composition comprising the same structure as in example 12, having an average molecular weight of 2700, and an average hydroxyl functionality of 1.6, was prepared as in Example 12.

100 parts of fluoroelastomer gum A was compounded, milled, press-cured, and post-cured as in Example 1, using 20 phr of the above fluorinated ether composition. The results of the tests are shown in Table 1.

EXAMPLE 10

A fluorinated ether composition comprising the same structure as in Example 8, having an average molecular weight of 1065, and an average hydroxyl functionality of 1.64, was prepared as in Example 8.

100 parts by weight of fluoroelastomer gum A was compounded, milled, press-cured, and post-cured as in Example 1, using 20 phr of the above fluorinated ether composition. The results of the tests are shown in Table 1.

EXAMPLE 11

A fluorinated ether composition comprising the same structure as in Example 8, having an average molecular weight of 852, and an average hydroxyl functionality of 1.62, was prepared as in Example 8.

100 parts by weight of fluoroelastomer gum B was added, compounded, milled, press-cured, and post-cured as in Example 1, using 20 phr of the above fluorinated ether composition. The results of the tests are shown in Table 1.

EXAMPLE 12

A fluorinated ether composition comprising the structure $HO-CH_2-CF_2-O-(CF_2CF_2OCF_2O)_n-CF_2-CH_2-OH$, having an average hydroxyl functionality of 1.03, and an average molecular weight of 1050, was prepared by polymerization of dioxolane, followed by fluorination by the technique taught in U.S. Pat. No. 4,755,567. The fluorinated polymer was then cracked into an oil as taught in U.S. Pat. No. 4,894,484. The resulting oil was reacted with methanol and reduced with sodium borohydride.

100 parts by weight of fluoroelastomer gum A was added, compounded, milled, press-cured, and post-cured as in Example 1, using 20 phr of the above fluorinated ether composition. The results of the tests are shown in Table 1.

EXAMPLE 13

A fluorinated ether composition comprising the same structure as in Example 12, having an average molecular weight of 2600, and an average hydroxyl functionality of 1.03, was prepared as in Example 16.

100 parts by weight of fluoroelastomer gum A was compounded, milled, press-cured, and post-cured as in Example 1, using 20 phr of the above fluorinated ether composition. The results of the tests are shown in Table 1.

EXAMPLE 14

A fluorinated ether composition comprising the structure $HO-CH_2-CF_2-O-(CF_2CF_2OCF_2CF_2OCF_2O)_n-CF_2-CH_2-OH$, having an average molecular weight of 1180, and an average hydroxyl functionality of 1.01, was prepared by polymerization of diethylene glycol and formaldehyde, and by fluorination as in Example 100 parts by weight of fluoroelastomer gum A was compounded, milled, press-cured, and post-cured as in Example 1, using 20 phr of the above fluorinated ether composition. The results of the tests are shown in Table 1.

EXAMPLE 15

A fluorinated ether composition comprising the same structure as in Example 14, having an average molecular weight of 2450, and an average hydroxyl functionality of 1.01, was prepared as in Example 14.

100 parts by weight of fluoroelastomer gum A was compounded, milled, press-cured, and post-cured as in Example 1, using 20 phr of the above fluorinated ether composition. The results of the tests are shown in Table 1.

EXAMPLE 16

A fluorinated ether composition comprising the structure $HO-CH_2-CF_2-CF_2-O-O-CF_2CF_2-CH_2-OH$, having an average molecular weight of 278, and an average hydroxyl functionality of 2.0, was prepared by direct fluorination, as in Example 1, of dimethyl oxydipropionate, which in turn was prepared from 3,3'-oxydipropionitrile (Aldrich Chemical, Milwaukee, Wis.) by treatment with methanol and acid.

100 parts by weight of fluoroelastomer gum A was compounded, milled, press-cured, and post-cured as in Example 1, using 5 phr of the above fluorinated ether composition. The results of the tests are shown in Table 1.

Example 1, using 20 phr of the above fluorinated ether composition. The results of the tests are shown in Table 2.

COMPARATIVE EXAMPLE 4-C

TABLE 1

| Example | Fluoro-Elastomer Gum | (Crosslinker) Amount (phr) | Hardness | 100% Modulus | Tensile | % Elongation | TR-10 (°C.) |
|---|---|---|---|---|---|---|---|
| | | Fluorinated Ether Composition | | | | | |
| 1 | A | 20 | 75 | 790 | 1585 | 180 | −26.1 |
| 2 | A | 20 | 81 | 1460 | 1870 | 120 | −27.2 |
| 3 | A | 20 | 77 | 1055 | 1925 | 140 | −27.3 |
| 4 | B | 6.2 | 73 | 534 | 1429 | 263 | −15.2 |
| 5 | B | 24.5 | 67 | 361 | 727 | 236 | −22.0 |
| 6 | B | 20 | 73 | 780 | 1767 | 179 | −21.1 |
| 7 | C | 15 | 77 | 870 | 1745 | 140 | −16.7 |
| 8 | A | 20 | 79 | 1490 | 2160 | 120 | −23.9 |
| 9 | A | 20 | 69 | 460 | 1465 | 385 | −21.7 |
| 10 | A | 20 | 79 | 1155 | 2080 | 150 | −23.9 |
| 11 | B | 20 | 73 | 536 | 1355 | 260 | −18.0 |
| 12 | A | 20 | 71 | 430 | 2080 | 320 | −24.4 |
| 13 | A | 20 | 71 | 395 | 1625 | 240 | −22.2 |
| 14 | A | 20 | 72 | 425 | 1730 | 250 | −24.4 |
| 15 | A | 20 | 71 | 460 | 1955 | 260 | −22.8 |
| 16 | A | 5 | 79 | 1310 | 2245 | 130 | −21.7 |
| Comparative | | Bishenol AF | | | | | |
| 1-C | A | 2 | 79 | 900 | 2000 | 200 | −17.8 |
| 2-C | B | 2 | 82 | 765 | 2046 | 267 | −11.2 |
| 3-C | C | 2 | 71 | 660 | 1950 | 230 | −9.4 |

Table 1 shows that fluorinated ether compositions with hydroxyl functionality can be used as crosslinking agents in fluoroelastomer gums to improve the low-temperature performance while retaining the other desired physical properties of the cured fluoroelastomer gum.

Each fluoroelastomer gum composition comprising a fluorinated ether composition resulted in a cured article of lower TR-10 than a corresponding conventional composition. Compare the Examples comprising gum A (TR-10 is from −21.7° C. to −27.3° C.) to Comparative Example 1-C (TR-10=−17.8° C.). Compare Examples comprising gum B (TR-10 is from −15.2° C. to −21.1° C.) to Comparative Example 2-C (TR-10=−11.2° C.). Compare Example 7 (TR-10=−16.7° C.) to Comparative Example 3-C (TR-10=−9.4° C.).

For comparative purposes, the fluoroelastomer gum A was compounded as before, substituting 1.0 phr of diaminocarbamate (DIAC) for the fluorinated ether composition of Example 17 and omitting the triphenylbenzyl phosphonium chloride. The gum was cured as previously described, and tested. The results are shown in Table 2.

EXAMPLE 18

A fluorinated ether composition comprising the same structure as in Example 17, having an average molecular weight of 763, and an average amino functionality of 1.74, was prepared as in Example 17.

100 parts by weight of fluoroelastomer gum A was compounded, milled, press-cured, and post-cured as in Example 1, using 20 phr of the above fluorinated ether composition. The results of the tests are shown in Table 2.

TABLE 2

| Example | (Crosslinker) Amount (phr) | Hardness | 100% Modulus | Tensile | % Elongation | TR-10 (°C.) |
|---|---|---|---|---|---|---|
| | Fluorinated Ether Composition | | | | | |
| 17 | 20 | 74 | 490 | 2330 | 300 | −22.2 |
| 18 | 20 | 77 | 1140 | 2280 | 160 | −25.0 |
| Comparative | DIAC | | | | | |
| 4-C | 1 | 75 | 900 | 2000 | 200 | −17.8 |

EXAMPLE 17

In this example, a fluorinated ether composition comprising the structure $H_2N-CH_2-CF_2-O-(CF_2CF_2O)_n-CF_2-CH_2-NH_2$, having an average molecular weight of 615, and an average amino functionality of 1.21, was prepared by reduction of the amide composition comprising the structure $H_2N-CO-CF_2-O-(CF_2CF_2O)_n-CF_2-CO-NH_2$. The amide composition was prepared from the reaction of ammonia with the corresponding fluorinated methyl ester composition.

100 parts by weight of fluoroelastomer gum A was compounded, milled, press-cured, and post-cured as in Table 2 shows that fluorinated ether compositions with amino functionality can be used, in conjunction with an accelerator such as triphenylbenzyl phosphonium chloride, as crosslinking agents in fluoroelastomer gums to improve the low-temperature performance while retaining the physical properties of the cured gum. Examples 17 and 18 have lower TR-10 than Comparative Example 4-C, but still have a desirable range of hardness, modulus, tensile, and elongation properties.

EXAMPLE 19

A fluorinated ether composition comprising the structure $CH_2=CHCH_2O-CH_2CF_2-O-(CF_2CF_2O)_n-CF_2CH_2-OCH_2CH=CH_2$, having an average molecular weight of 776, and an average allyl functionality of 1.56, was prepared by treatment of the fluorinated ether composition of Example 1 with allyl bromide.

To 100 parts by weight of gum F, a peroxide curable fluoroelastomer gum, was added 30 phr of carbon black, 3 phr of $Ca(OH)_2$, and 2.5 phr of Luperco 101XL (available from Lucidol Corp.) using a two roll mill. To this compound mixture was added 20 phr of the above fluorinated ether composition. Milling continued until a homogeneous blend formed. The gum was press-cured for 15 minutes at 177° C. and then post-cured for 24 hours at 204° C. The results of the tests are shown in Table 3.

EXAMPLE 20

100 parts by weight of fluoroelastomer gum VITON TM VTR-6279 (available from DuPont) was blended with 30 phr of carbon black, 3 parts of $Ca(OH)_2$ and 2.5 parts of Luperco 101XL. To this compounded mixture was added 20 phr of the fluorinated ether composition of Example 19, using a two-roll mill. Milling continued until a homogeneous blend formed. The compounded gum was press-cured for 15 minutes at 177° C. and post-cured for 24 hours at 204° C. The results of the tests are shown in Table 3.

COMPARATIVE EXAMPLE 5-C

For comparative purposes the gum VITON TM VTR-6279 was compounded as in Example 19 omitting the fluorinated ether composition and using 2.5 phr of triallylisocyanurate (TAIC) as the crosslinking agent. The gum was then cured and tested as in Example 19. The results of the tests are shown in Table 3.

COMPARATIVE EXAMPLE 6-C

For comparative purposes, gum F was compounded as in Example 19, substituting 3 phr of triallylisocyanurate (TAIC) as the crosslinking agent. The gum was cured and tested as in Example 19. The results of the tests are shown in Table 3.

EXAMPLE 21

100 parts by weight of fluoroelastomer gum D was compounded, milled, press-cured, and post-cured as in Example 19 using 20 phr of the fluorinated ether composition of Example 19. The results of the tests are shown in Table 3.

COMPARATIVE EXAMPLE 7-C

For comparative purposes, the fluoroelastomer gum D was compounded as in Example 19, substituting 3 phr of triallylisocyanurate (TAIC) as the crosslinking agent. The gum was cured and tested as in Example 19. The results of the tests are shown in Table 3.

EXAMPLE 22

100 parts by weight of fluoroelastomer gum D was compounded, milled, press-cured, and post-cured as in Example 19, using 5 phr of the fluorinated ether composition of Example 19. The results of the tests are shown in Table 3.

EXAMPLE 23

The fluorinated ether composition comprising the structure $CH_2=CHCH_2-NHC(O)-CF_2O-(CF_2CF_2O)_nCF_2-C(O)NH-CH_2CH=CH_2$, having an average molecular weight of 895, and an average allyl functionality of 1.56, was prepared by the reaction of the corresponding fluorinated methyl ester composition with allylamine.

100 parts by weight of fluoroelastomer gum D was compounded, milled, press-cured, and post-cured as in Example 14, using 20 phr of the above fluorinated ether composition. The results of the tests are shown in Table 3.

EXAMPLE 24

A fluorinated ether composition comprising structure $CH_2=CHCH_2OCH_2-(CF_2)_3O-(CF_2CF_2CF_2CF_2O)_n-(CF_2)_3CH_2-OCH_2CH=CH_2$, having an average molecular weight 610, and an average allyl functionality of 1.96, was prepared by treatment of the fluorinated ether composition of Example 8 with allyl bromide.

100 parts by weight of fluoroelastomer gum D compounded, milled, press-cured, and post-cured as in Example 19, using 10 phr of the above fluorinated ether composition. The results of the tests are shown in Table 3.

EXAMPLE 25

100 parts by weight of fluoroelastomer gum D was compounded, milled, press-cured, and post-cured as in Example 19, using 5 phr of the fluorinated ether composition of Example 24. The results of the tests are shown in Table 3.

EXAMPLE 26

100 parts by weight of fluoroelastomer gum G, a peroxide curable fluoroelastomer gum, was compounded, milled, press-cured, and post-cured as in Example 19, using 20 phr of the fluorinated ether composition of Example 19. The results of the tests are shown in Table 3.

COMPARATIVE EXAMPLE 8-C

For comparative purposes, fluoroelastomer gum G was compounded as in Example 19, substituting 3 phr of TAIC as the crosslinking agent. The gum was cured and tested as in Example 19. The results are shown in Table 4.

EXAMPLE 27

100 parts by weight of fluoroelastomer gum E, a peroxide curable fluoroelastomer gum, was compounded, milled, press-cured, and post-cured as in Example 19, using 20 phr of the fluorinated ether composition of Example 19. The results of the tests are shown in Table 4.

COMPARATIVE EXAMPLE 9-C

For comparative purposes, the fluoroelastomer gum E was compounded, milled, press-cured, and post-cured as in Example 19, substituting 3.0 phr TAIC as the cross-linking agent. The gum was cured and tested as before and the results shown in Table 4.

TABLE 3

| Example | Fluoro Elastomer Gum | Amount (phr) | Hardness | 100% Modulus | Tensile | % Elongation | TR-10 (°C.) |
|---|---|---|---|---|---|---|---|
| | | Fluorinated Ether Composition | | | | | |
| 19 | F | 20 | 65 | 160 | 1800 | 320 | −16.1 |
| 20 | VITON TM | 20 | 71 | 395 | 1660 | 200 | −19.4 |
| 21 | D | 20 | 65 | 240 | 1640 | 400 | −23.3 |
| 22 | D | 5 | 65 | 275 | 1940 | 360 | −23.3 |
| 23 | D | 20 | 65 | 280 | 1395 | 340 | −22.2 |
| 24 | D | 10 | 65 | 230 | 2095 | 360 | −22.8 |
| 25 | D | 5 | 72 | 385 | 2740 | 260 | −20.6 |
| 26 | G | 20 | 67 | 320 | 1960 | 160 | −30.0 |
| 27 | E | 20 | 64 | 895 | 2235 | 380 | −32.8 |
| Comparative | | TAIC | | | | | |
| 5-C | VITON TM | 2.5 | 79 | 1030 | 3160 | 220 | −10.0 |
| 6-C | F | 3 | 71 | 430 | 2115 | 250 | −11.7 |
| 7-C | D | 3 | 75 | 900 | 2000 | 200 | −19.4 |
| 8-C | G | 3 | 74 | 1024 | 2249 | 168 | −24.8 |
| 9-C | E | 3 | 64 | 320 | 1465 | 350 | −31.1 |

Table 3 shows that fluorinated ether compositions with allyl functionality can be used as crosslinking agents in fluoroelastomer gums to improve low-temperature performance of the cured gum, while retaining the other desired physical properties.

EXAMPLE 28

A fluorinated ether composition comprising the structure $CF_3-O-(CF_2CF_2O)_n-CF_2CH_2-OH$, having an average molecular weight of 920, and an average hydroxyl functionality of 0.92, was prepared by direct fluorination, as in Example 1, of poly(ethylene glycol) monomethyl ether (available from Aldrich).

To 100 parts by weight of fluoroelastomer gum A was added 0.5 phr of triphenylbenzyl phosphonium chloride, followed by 30 phr of carbon black, 3 phr of MgO, 6 phr of $Ca(OH)_2$, and 2 phr of Bisphenol-AF using a two roll mill. To this compounded mixture was added 10 phr of the above fluorinated ether composition. Milling continued until a homogeneous blend formed. The gum was press-cured for 15 minutes at 177° C. and then post-cured for 24 hours at 204° C. The results of the tests are shown in Table 4.

EXAMPLE 29

A fluorinated ether composition comprising the same structure as in Example 28, having an average molecular weight of 700, and an average hydroxyl functionality of 0.98, was prepared as in Example 28.

100 parts by weight of fluoroelastomer gum A was compounded, milled, press-cured and post-cured as in Example 28, using 15 phr of the above fluorinated ether composition. The results of the tests are shown in Table 4.

EXAMPLE 30

A fluorinated ether composition comprising the structure $CF_3-O-(CF_2CF_2O)_n-CF_2CH_2-O-CH_2CH=CH_2$, was prepared from the fluorinated ether composition of Example 28 by treatment with allyl bromide. The resulting composition had an average molecular weight of 948 and an average allyl functionality of 0.92.

To 100 parts by weight of fluoroelastomer gum VITON TM VTR-6279 (available from DuPont) was added 30 phr of carbon black, 2 phr of $Ca(OH)_2$, 2.5 phr of Luperco 101XL, and 2.5 phr TAIC using a two-roll mill. To this compounded mixture was added 20 phr of the above fluorinated ether composition. Milling was continued until a homogeneous blend was formed. The compounded gum was press-cured and post cured as in Example 20. The results of the tests are shown in Table 4.

TABLE 4

| Example | Fluoro Elastomer Gum | Fluorinated Ether Composition Amount (phr) | Hardness | 100% Modulus | Tensile | % Elongation | TR-10 (°C.) |
|---|---|---|---|---|---|---|---|
| 28 | A | 15.0 | 78 | 956 | 2240 | 150 | −23.9 |
| 29 | A | 15.0 | 77 | 860 | 2235 | 160 | −21.1 |
| 30 | VITON TM | 20.0 | 74 | 685 | 2825 | 220 | −16.7 |
| Comparative | | | | | | | |
| 1-C | A | — | 79 | 900 | 2000 | 200 | −17.8 |
| 2-C | VITON TM | — | 79 | 1030 | 3160 | 220 | −10.0 |

Table 4 shows that monofunctional fluorinated ether compositions can be used in conjunction with a conventional crosslinking agent, such as Bisphenol AF or TAIC, to improve the low-temperature performance of cured fluoroelastomer gums while retaining the other desired physical properties.

Compounded gums in the following Examples 31 to 37 and Comparative Examples 10-C to 13-C were prepared and their release properties evaluated. A 2.5 cm×2.5 cm×1.3 mm thick coupon of each compounded gum was press-cured in a clean mold, cooled, and then peeled out of the mold by hand. The ease or difficulty in peeling the samples out of the mold was evaluated comparatively, assigning a mold-release value of from zero to 4, with a 4 representing the easiest release characteristics.

The press-cured samples were weighed, post-cured, and re-weighed to give the percent weight loss of the sample. Three gums were used (A, D, and H). For each gum an initial composition was made and then further compositions of the same composition were made except with additional materials. The initial compositions are Comparative Examples 10-C, 12-C, and 13-C. By comparing the percent weight losses of the initial compositions with compositions containing additional materials, and by assuming that any increase in percent weight loss was due to loss of the additional materials, the percent weight loss of the additional materials was calculated.

Compression set of cured compounded gums was determined after 70 hours at 200° C. using ASTM D395 method B using a 2.5 cm inside diameter O-ring with a 3.5 mm cross section.

The results of all these evaluations are shown in Table 5.

COMPARATIVE EXAMPLE 10-C

To 100 parts of fluoroelastomer gum A, using a two-roll mill, was added 0.5 phr of triphenylbenzyl phosphonium chloride, followed by 30 phr of carbon black, 3 phr of MgO, and 6 phr of $Ca(OH)_2$. To this compounded mixture, 2.0 phr of Bisphenol-AF were milled. Milling continued until a homogeneous blend formed. The gum was press-cured for 15 minutes at 177° C. and then post-cured for 24 hours at 232° C.

COMPARATIVE EXAMPLE 11-C

Fluoroelastomer gum A was compounded as in Comparative Example 10-C, with the addition of 2.5 phr of dichlorodiphenyl sulfone as mold release agent. This compounded mixture was press-cured and post-cured as in Comparative Example 10-C.

EXAMPLE 31

A fluorinated ether composition comprising the structure $CF_3-O-(CF_2CF_2O)_nCF_2CH_2-OH$, having an average molecular weight of 398 and an average hydroxyl value of 1, was prepared by direct fluorination of poly(ethylene glycol) monomethyl ether (available from Aldrich).

Fluoroelastomer gum A was compounded as in Comparative Example 10-C, with the addition of 4.0 phr of the above fluorinated ether composition. Milling continued until a homogeneous blend formed. The gum was press-cured and post-cured as in Comparative Example 10-C.

EXAMPLE 32

A fluorinated ether composition having the same structure as in Example 31, except having an average molecular weight of 701 and a hydroxyl value of 0.98, was prepared as in Example 31. The fluoroelastomer gum A was compounded as in Comparative Example 10-C, with the addition of 4.0 phr of the above fluorinated ether composition, then press-cured and post-cured as in Comparative Example 10-C.

EXAMPLE 33

A fluorinated ether composition comprising the structure $HO-CH_2-CF_2-O-(CF_2CF_2O)_nCF_2CH_2-OH$, having an average molecular weight of 956 and an average hydroxyl value of 1.56, was prepared by direct fluorination of poly(ethylene glycol) (available from Aldrich).

Fluoroelastomer gum A was compounded as in Comparative Example 10-C, with the addition of 4.0 phr of the above fluorinated ether composition. Milling continued until a homogeneous blend formed. The gum was press-cured and post-cured as in Comparative Example 10-C.

COMPARATIVE EXAMPLE 12-C

To 100 parts of fluoroelastomer gum D (a peroxide curable fluoroelastomer gum) was added 2.5 phr of Luperco 101XL peroxide (available from Lucidol Corp.), followed by 30 phr of carbon black, 3 phr of $Ca(OH)_2$, and 2.5 phr of triallylisocyanurate. Milling continued until a homogeneous blend formed. The gum was press-cured and post-cured as in Comparative Example 10-C.

EXAMPLE 34

A fluorinated ether composition comprising the structure $CF_3-O-(CF_2CF_2O)_nCF_2CH_2-OCH_2CH=CH_2$, having an average molecular weight of 948 and an average allyl functionality of 1.0, was prepared by treatment of the fluorinated ether composition of Example 31 with allyl bromide.

Fluoroelastomer gum D was compounded as in comparative Example 12-C, with the addition of 3 phr of the above fluorinated ether composition. Milling continued until a homogeneous blend formed. The gum was press-cured and post-cured as in Comparative Example 10-C.

EXAMPLE 35

A fluorinated ether composition comprising the structure $CH_2=CHCH_2-O-CH_2CF_2-O-(CF_2CF_2O)_nCF_2CH_2-OCH_2CH=CH_2$, having an average molecular weight of 776 and an average allyl functionality of 1.6, was prepared by treatment of the fluorinated ether composition of Example 33 with allyl bromide.

Fluoroelastomer gum D was compounded as in Comparative Example 12-C, with the addition of 3 phr of the above fluorinated ether composition. Milling continued until a homogeneous blend formed. The gum was press-cured and post-cured as in Comparative Example 10-C.

EXAMPLE 36

A fluorinated ether composition having the same structure as in Example 35, except having an average molecular weight of 1220 and an average allyl functionality of 1.67, was prepared as in Example 35. Fluoroelastomer gum D was compounded as in Comparative Example 12-C, with the addition of 4.0 phr of the above fluorinated ether composition, then press-cured and post-cured as in comparative Example 10-C.

COMPARATIVE EXAMPLE 13-C

To 100 parts of fluoroelastomer gum H (a peroxide curable fluoroelastomer gum) was added 30 phr of carbon black, 3 phr of $Ca(OH)_2$, 4 phr of 40% active α,α-bis-[t-butylperoxy]diisopropyl benzene (commercially available as Vulkup TM 40KE), 4 phr triallylisocyanurate, 1 phr of carnauba wax and 1 phr of Span 60 TM sorbitan monostearate. Milling continued until a homogeneous blend formed. The gum was press-cured and post-cured as in Comparative Example 10-C.

EXAMPLE 37

Fluoroelastomer gum H was compounded as in Comparative Example 13-C, with the addition of 3 phr of the diallyl ether of Example 36. Milling continued until a homogeneous blend formed. The gum was press-cured and post-cured as in Comparative Example 10-C.

TABLE 5

| Example | Mold Release Value | % Weight Loss of Additional Materials | Compression Set, % |
|---|---|---|---|
| 31 | 0 | 0 | — |
| 32 | 2 | 6 | 17 |
| 33 | 1 | 9 | 17 |
| 34 | 2 | 23 | 46 |
| 35 | 1 | 17 | 50 |
| 36 | 2 | 5 | 47 |
| 37 | 4 | 0 | 56 |
| 10-C | 0 | — | 17 |
| 11-C | 3 | 100 | 17 |
| 12-C | 0 | — | 37 |
| 13-C | 0 | — | 66 |

The data in Table 5 show that the compositions of this invention can provide cured gums with excellent mold release and which do not volatilize or increase the compression set significantly. The molding of conventional fluoroelastomer compounds generally requires the addition of processing agents or mold release additives at the molding step. A general deficiency of current commercial additives is that they either volatilize or cause an increase in compression set. Volatilization is undesirable because it may create pollution problems and shrinkage of the molded part. In Comparative Example 11-C dichlorodiphenyl sulfone was added and, although the mold release was excellent, the dichlorodiphenyl sulfone was volatized.

Compounded gums in the following Examples 38 to 44 and Comparative Examples 14-C to 16-C were prepared and their resistance to scorch evaluated. The results are summarized in Table 6 below.

Many conventional fluoroelastomers generally exhibit a tendency to become "scorchy", i.e., they cure prematurely or too rapidly when compounded. The curing is effected at an elevated temperature by milling in the curing agent and allowing sufficient time at the elevated temperature for the curing agent to react with the elastomer. Although use of many curing agents satisfy the physical properties requirement of the ultimate product by increasing its tensile strength, hardness and elongation, often some undesirable side effects are observed during curing. One of these side effects is called "scorch". Scorch is a function of the activity of the curing agent and the temperature utilized and is said to be the result of too fast or premature curing at some point prior to the final curing of the end product. In the present invention it has been found that the selection of the acid acceptor can decrease the tendency of the compounded gum to scorch. The suitability of a particular acid accepter depends on the particular crosslinking agent used and can be evaluated by using ASTM D-1566 (which measures Mooney scorch).

EXAMPLE 38

To 100 parts of fluoroelastomer gum A, using a two-roll mill, was added 0.5 phr of triphenylbenzyl phosphonium chloride, followed by 30 phr of carbon black, 3 phr of MgO, and 6 phr of Ca(OH)$_2$. To this compounded mixture was milled 20 phr of the fluoropolyether diol having the structure HO—CH$_2$CF$_2$—O—(CF$_2$CF$_2$O)$_n$CF$_2$—CH$_2$—OH, having a molecular weight of 844 and a functionality of 1.4. Milling continued until a homogeneous blend formed. The compounded gum was measured for resistance to scorch.

EXAMPLE 39

To 100 parts of fluoroelastomer gum A, using a two-roll mill, was added 0.5 phr of triphenylbenzyl phosphonium chloride, followed by 30 phr of carbon black and 20 phr of ZnO. To this compounded mixture was milled 10 phr of the fluoropolyether diol having the structure HO—CH$_2$CF$_2$—O—(CF$_2$CF$_2$O)$_n$CF$_2$CH$_2$—OH, having a molecular weight of 844 and a functionality of 1.4. Milling continued until a homogeneous blend formed. The compounded gum was measured for resistance to scorch.

EXAMPLE 40

To 100 parts of fluoroelastomer gum A, using a two-roll mill, was added 0.5 phr of triphenylbenzyl phosphonium chloride, followed by 30 phr of carbon black, 20 phr of ZnO, and 2 phr of dibasic lead phosphite (commercially available as Dyphos TM heat stabilizer). To this compounded mixture was milled 20 phr of the fluoropolyether diol having the structure HO—CH$_2$CF$_2$—O—(CF$_2$CF$_2$)$_n$CF$_2$CH$_2$—OH, having a molecular weight of 844 and a functionality of 1.4. Milling continued until a homogeneous blend formed. The compounded gum was measured for resistance to scorch.

EXAMPLE 41

To 100 parts of fluoroelastomer gum A, using a two-roll mill, was added 0.5 phr of triphenylbenzyl phosphonium chloride, followed by 30 phr of carbon black, 10 phr of ZnO, and 4 phr of dibasic lead phosphite. To this compounded mixture was milled 20 phr of the fluoropolyether diol having the structure HO—CH$_2$CF$_2$—O—(CF$_2$CF$_2$O)$_n$CF$_2$CH$_2$—OH, having a molecular weight of 844 and a functionality of 1.4. Milling continued until a homogeneous blend formed. The compounded gum was measured for resistance to scorch.

EXAMPLE 42

To 100 parts of fluoroelastomer gum A, using a two-roll mill, was added 0.5 phr of triphenylbenzyl phosphonium chloride, followed by 30 phr of carbon black, 20 phr of ZnO, and 4 phr of lead oxide. To this compounded mixture was milled 20 phr of the fluoropolyether diol having the structure HO—CH$_2$CF$_2$—O—(CF$_2$CF$_2$O)$_n$CF$_2$CF$_2$—OH, having a molecular weight of 844 and a functionality of 1.4. Milling continued until a homogeneous blend formed. The compounded gum was measured for resistance to scorch.

EXAMPLE 43

To 100 parts of fluoroelastomer gum B, using a two-roll mill, was added 0.5 phr of triphenylbenzyl phosphonium chloride, followed by 30 phr of carbon black, 3 phr of MgO, and 6 of Ca(OH)$_2$. To this compounded mixture was milled 20 phr of the fluoropolyether diol having the structure HOCH$_2$CF$_2$—O—(CF$_2$C F$_2$O)$_n$CF$_2$CH$_2$—OH, having a molecular weight of 844 and a functionality of 1.4. Milling continued until a homogeneous blend formed. The compounded gum was measured for resistance to scorch.

EXAMPLE 44

To 100 parts of fluoroelastomer gum B, using a two-roll mill, was added 0.5 phr of triphenylbenzyl phosphonium chloride, followed by 30 phr of carbon black, 20 phr of ZnO, and 4 phr of dibasic lead phosphite. To this compounded mixture was milled 20 phr of the fluoropolyether diol having the structure HO—CH$_2$CF$_2$—O—(CF$_2$CF$_2$O)$_n$CF$_2$CH$_2$—OH having a molecular weight of 844 and a functionality of 1.4. Milling continued until a homogeneous blend formed. The compounded gum was measured for resistance to scorch.

COMPARATIVE EXAMPLE 14-C

To 100 parts of fluoroelastomer gum A was added 0.5 phr of triphenylbenzyl phosphonium chloride, followed by 30 phr of carbon black, 3 phr of MgO, and 6 phr of Ca(OH)$_2$. To this compounded mixture was milled 2.1 phr of Bisphenol AF ("BF6"). Milling continued until a homogeneous blend formed. The compounded gum was measured for resistance to scorch.

COMPARATIVE EXAMPLE 15-C

To 100 parts of fluoroelastomer gum A, using a two-roll mill, was added 0.5 phr of triphenylbenzyl phosphonium chloride, followed by 30 phr of carbon black, 3 phr of MgO, and 6 phr of Ca(OH)$_2$. To this compounded mixture was milled 13 phr of fluoropolyether diol described in U.S. Pat. No. 4,810,760 (Streparola et al.) and in U.S. Pat. No. 4,894,418 (Streparola et al.), having a MW of about 2000 and a functionality of 1.9 and available from Ausimont as Fomblin ™ Z-DOL. The backbone of said fluoropolyether comprises randomly distributed perfluoroethylenoxy units and perfluoromethyleneoxy units. Milling continued until a homogeneous blend formed. The compounded gum was measured for resistance to scorch.

COMPARATIVE EXAMPLE 16-C

To 100 parts of fluoroelastomer gum A, using a two-roll mill, was added 0.5 phr of triphenylbenzyl phosphonium chloride, followed by 30 phr of carbon black, 20 phr of ZnO, and 6 phr of lead oxide. To this compounded mixture was milled 13 phr of fluoropolyether diol described in Comparative Example 15-C. Milling continued until a homogeneous blend formed. The compounded gum was measured for resistance to scorch.

Various modifications and alterations of this invention will become apparent to those skilled in the art without departing from the scope and spirit of this invention.

What is claimed is:

1. A fluorocarbon elastomer composition comprising
  (A) fluorocarbon elastomer gum, and
  (B) monohydroxy terminated fluorinated mono- or polyether of linear and regular structure, and
wherein said hydroxy is reactive with said gum.

2. The composition of claim 1 wherein said fluorinated ether is

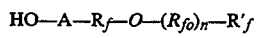

with a number average molecular weight between 250 and 3,000; where Q is a divalent linking group; R'$_f$ is a non-branched, monovalent, perfluoroalkyl group containing from 1 to 10 carbon atoms; R$_f$ is a non-branched, perfluoroalkylene group of 1 to 20 carbon atoms, R$_{fo}$ is a perfluoroalkyleneoxy group selected from the group consisting of —(CF$_2$)$_2$—O—, —(CF$_2$)$_3$—O—, —(CF$_2$)$_4$—O—, —CF$_2$—CF$_2$—O—CF$_2$—O—, and —CF$_2$—CF$_2$—O—CF$_2$CF$_2$—O—CF$_2$—O—; and n is a number from 0 to 30.

3. The composition of claim 2 wherein Q is selected from the group consisting of —C$_y$H$_{2y}$— where y is 1 to 20, —C$_6$H$_4$—, —C$_6$H$_3$Cl—, —C$_2$H$_4$O—, and combinations thereof.

4. The composition of claim 2 where R$_{fo}$ is —CF$_2$CF$_2$—O—.

5. The composition of claim 1 further comprising a curing system.

6. The composition of claim 1 wherein said fluorinated ether is present in an amount sufficient to impart, to the composition in its cured state, improved low-temperature flexibility or improved mold-release properties or both.

7. The composition of claim 1 wherein the amount of said fluorinated ether present is 0.5 to 50 weight percent based on the weight of said gum.

8. The composition of claim 1 wherein said gum comprises a polymer whose interpolymerized units com-

TABLE 6

| | Fluoro-elastomer | Amount Of Curing Agent, Phr | Acid Acceptor and Amount Thereof, phr | Other Acid Acceptor and Amount Thereof, phr | Mooney Scorch (minutes to 10 pt. rise) | Points rise/25 minutes |
|---|---|---|---|---|---|---|
| Example | | | | | | |
| 38 | A | 20 | MgO, 3 | Ca(OH)$_2$, 16 | 7 | — |
| 39 | A | 10 | ZnO, 20 | None | 25+ | 0 |
| 40 | A | 20 | ZnO, 20 | Dyphos ™, 2 | 25+ | 0 |
| 41 | A | 20 | ZnO, 10 | Dyphos ™, 4 | 25+ | 5 |
| 42 | A | 20 | ZnO, 20 | PbO, 4 | 25+ | 1 |
| 43 | B | 20 | MgO, 3 | Ca(OH)$_2$, 6 | 7 | — |
| 44 | B | 20 | ZnO, 20 | Dyphos ™, 4 | 25+ | 2 |
| Comparative Examples | | | | | | |
| 14-C | A | 2.1 | MgO, 3 | Ca(OH)$_2$, 6 | 25+ | 0 |
| 15-C | A | 13 | MgO, 3 | Ca(OH)$_2$, 6 | 1.5 | — |
| 16-C | A | 13 | ZnO, 20 | PbO, 4 | 10 | — |

The Mooney scorch data in Table 6 show that resistance to scorch can be affected by the acid acceptor. The data in Table 6 also show that fluoropolyethers of this invention give compounded gums with improved scorch resistance compared to compounded gums comprising the fluoropolyethers used in Comparative Examples 16-C and 17-C.

prise units derived from two or more of the following monomers, CF$_2$=CH$_2$, CF$_2$=CFCF$_3$, CF$_2$=CF$_2$, CH$_2$=CHCH$_3$, CF$_2$=CFOCF$_3$.

9. The composition of claim 1 wherein said gum comprises a copolymer of vinylidene fluoride, hexafluoropropene, and, optionally, tetrafluoroethylene.

10. The composition of claim 1 wherein said gum comprises a copolymer of vinylidene fluoride, tetrafluoroethylene, and propylene.

11. The composition of claim 1 further comprising a dihydroxy terminated fluorinated mono- or polyether of linear and regular structure, and wherein said dihydroxy is reactive with said gum.

12. The composition of claim 11 wherein said dihydroxy terminated ether is $$HO-A-R_f-O-(R_{fo})_n-R_f-Q-OH$$

with a number average molecular weight between 250 and 3,000; where Q is a divalent linking group; $R_f$ is a non-branched, perfluoroalkylene group of 1 to 20 carbon atoms; $R_{fo}$ is a perfluoroalkyleneoxy group selected from the group consisting of $-(CF_2)_2-O-(CF_2)_3-O-$, $(CF_2)_4-O-$, $CF_2-CF_2-O-CF_2-$, and $-CF_2-CF_2-O-CF_2CF_2-O-CF_2-O-$; and n is a number from 0 to 30.

13. A method of preparing an elastomer composition, comprising mixing
(A) fluorocarbon elastomer gum, and
(B) monohydroxy functional, fluorinated, mono- or polyether of linear and regular structure,
wherein said hydroxy is reactive with said gum.

14. The method of claim 13 wherein said fluorinated ether is $$HO-Q-R_f-O-(R_{fo})\ n-R'_f$$

with an average molecular weight between 250 and 3,000; where Q is a divalent linking group; $R'_f$ is a non-branched, monovalent, perfluoroalkyl group containing from 1 to 10 carbon atoms; $R_f$ is a non-branched, perfluoroalkylene group of 1 to 20 carbon atoms, $R_{fo}$ is a perfluoroalkyleneoxy group selected from the group consisting of $-(CF_2)_2-O-$, $-(CF_2)_3-O-$, $(CF_2)_4-O-$, $-CF_2-CF_2-O-CF_2-O-$, and $-CF_2-CF_2-O-CF_2CF_2-O-CF_2-O-$; and n is a number from 0 to 30.

15. A method of forming a cured elastomeric article, comprising the steps of:
1) shaping, at an elevated temperature into the form of an article, a compounded curable elastomer composition, comprising
   (A) fluorocarbon elastomer gum
   (B) monohydroxy functional, fluorinated, mono- or polyether of linear and regular structure, wherein said hydroxy is reactive with said gum, having structure $$HO-Q-R_f-O-(R_{fo})_n-R'_f$$

with a number average molecular weight between 250 and 3,000; where Q is a divalent linking group; $R'_f$ is a non-branched, monovalent, perfluoroalkyl group containing from 1 to 10 carbon atoms; $R_f$ is a non-branched, perfluoroalkylene group of 1 to 20 carbon atoms, $R_{fo}$ is a perfluoroalkyleneoxy group selected from the group consisting of $-(CF_2)_2-O-$, $-(CF_2)_3-O-$, $(CF_2)_4-O-CF_2-CF_2-O-CF_2-O-$, and $-CF_2-CF_2O-CF_2CF_2-O-CF_2-O-$; and n is a number from 0 to 30, and
   (C) a cure system for said gum; and
2) heating said formed article to cure said compounded composition.

16. A shaped article comprising the composition of claim 1 in its cured state.

* * * * *

UNITED STATES PATENT AND TRADEMARK OFFICE
CERTIFICATE OF CORRECTION

PATENT NO. : 5,384,374
DATED : January 24, 1995
INVENTOR(S) : Miguel A. Guerra and David A. Stivers It is certified that error appears in the above-indentified patent and that said Letters Patent is hereby corrected as shown below:

Col. 11, lines 44 and 46, each occurrence of "12" should read --8--.

Col. 12, line 42, "Example" should read --Example 12--.

Col. 16, lines 58, 61, and 68, each occurrence of "Table 4" should read --Table 3--.

Col. 17, line 53, "10 phr" should read --15 phr--.

Col. 20, line 24, "Example 31" should read --Example 32--.

Col. 22, line 24, that portion of the formula reading "$(CF_2CF_2)_n$" should read --$(CF_2CF_2O)_n$--.

Col. 22, line 49, that portion of the formula reading "$CF_2CF_2$-OH" should read --$CF_2CH_2$-OH--.

Col. 24, line 14, the formula "HO-A-$R_f$-O-$(R_{fo})_n$-$R'_f$" should read --HO-Q-$R_f$-O-$(R_{fo})_n$-$R'_f$--.

UNITED STATES PATENT AND TRADEMARK OFFICE
CERTIFICATE OF CORRECTION

PATENT NO. : 5,384,374

DATED : January 24, 1995

INVENTOR(S) : Miguel A. Guerra, et al

It is certified that error appears in the above-indentified patent and that said Letters Patent is hereby corrected as shown below:

Col. 25, line 11, the formula "HO-A-$R_f$-O-($R_{fo}$)$_n$-$R_f$-Q-OH" should read --HO-Q-$R_f$-O-($R_{fo}$)$_n$-$R_f$-Q-OH--.

Signed and Sealed this

Twenty-fifth Day of April, 1995

Attest:

BRUCE LEHMAN

*Attesting Officer*    *Commissioner of Patents and Trademarks*